United States Patent
Thorup et al.

(10) Patent No.: US 8,954,749 B2
(45) Date of Patent: Feb. 10, 2015

(54) METHODS, SYSTEMS, AND PRODUCT FOR HASHING USING TWISTED TABULATION

(75) Inventors: Mikkel Thorup, Shutesbury, MA (US); Mihai Patrascu, New York, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 134 days.

(21) Appl. No.: 13/441,393

(22) Filed: Apr. 6, 2012

(65) Prior Publication Data
US 2013/0268769 A1    Oct. 10, 2013

(51) Int. Cl.
*G06F 21/72* (2013.01)
(52) U.S. Cl.
USPC ............................................................ 713/189
(58) Field of Classification Search
USPC ...................................... 713/189, 161; 726/2
See application file for complete search history.

(56) References Cited

U.S. PATENT DOCUMENTS

| | | | |
|---|---|---|---|
| 6,307,935 B1 | 10/2001 | Crandall et al. | |
| 7,126,948 B2 | 10/2006 | Gooch et al. | |
| 7,212,634 B2 | 5/2007 | Briscoe | |
| 7,512,232 B2 | 3/2009 | Venkatesan et al. | |
| 7,701,884 B2 | 4/2010 | Chapweske et al. | |
| 7,961,873 B2 | 6/2011 | Ibrahim | |
| 8,139,765 B2 | 3/2012 | Ghouti et al. | |
| 2010/0166174 A1 | 7/2010 | Ghouti et al. | |
| 2010/0166175 A1 | 7/2010 | Ghouti et al. | |
| 2010/0177890 A1* | 7/2010 | Ghouti et al. | 380/30 |
| 2011/0202773 A1 | 8/2011 | Ghouti et al. | |

OTHER PUBLICATIONS

Feistel cipher, Wikipedia, 6 pages, Jan. 18, 2014.
Zobrist hashing, Wikipedia, 4 pages, Mar. 7, 2014.

* cited by examiner

*Primary Examiner* — Anthony Brown
(74) *Attorney, Agent, or Firm* — Scott P. Zimmerman, PLLC

(57) ABSTRACT

Methods, systems, and products describe a robust solution for the dictionary problem of data structures. A hash function based on tabulation is twisted to utilize an additional xoring operation and a shift. This twisted tabulation offers strong robustness guarantees over a set of queries in both linear probing and chaining.

20 Claims, 3 Drawing Sheets

US 8,954,749 B2

METHODS, SYSTEMS, AND PRODUCT FOR HASHING USING TWISTED TABULATION

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

This disclosure generally relates to communications and to cryptography and, more particularly, to network routing, to congestion reduction of data, and to algorithmic function encoding.

Monitoring of data networks is desired. Network operators monitor the performance of clients to identify any problems, including security issues, reliability concerns, and performance bottlenecks. An Internet router, for example, classifies packets of data with hash tables. If the hash tables cannot keep pace with Internet traffic, data will be lost. The router must therefore be monitored to ensure its worst-case performance meets minimum targets.

BRIEF DESCRIPTION OF THE SEVERAL VIEWS OF THE DRAWINGS

The features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
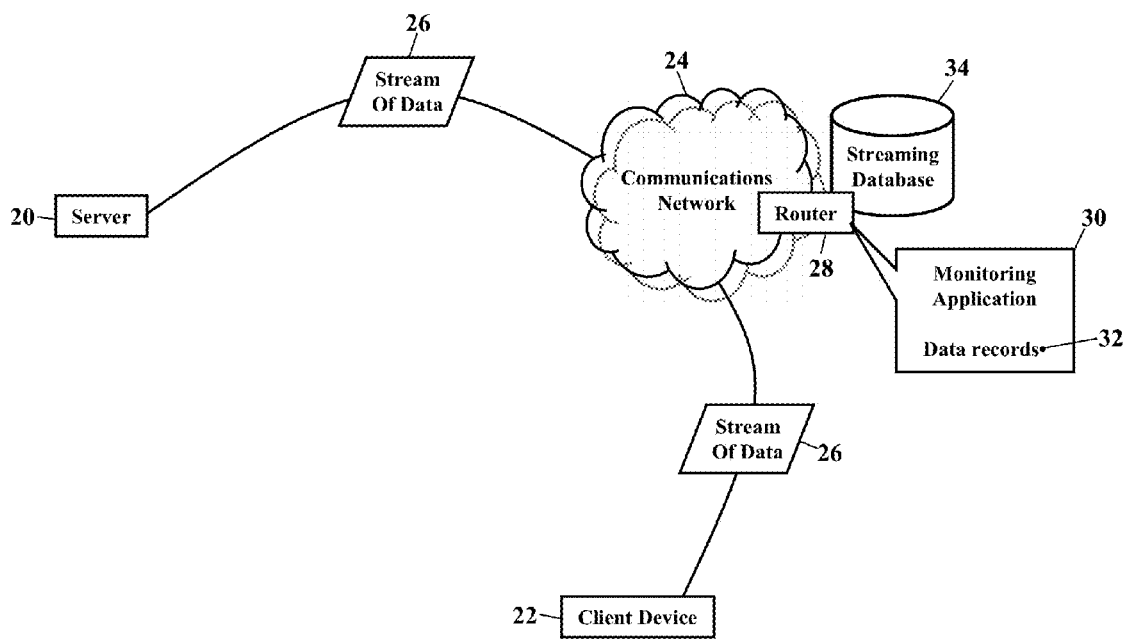
FIG. 1 is a simplified schematic illustrating an environment in which exemplary embodiments may be implemented.

FIG. 1 is a simplified schematic illustrating an environment in which exemplary embodiments may be implemented. FIG. 1 illustrates a client-server network architecture that monitors data traffic. A server 20 communicates with a client device 22 via a communications network 24. The server 20 sends a stream 26 of data to the client device 22. The stream 26 of data may include any content, such as a movie, music, call, or any other data. Regardless, the stream 26 of data is routed by a router 28. The router 28 receives and forwards the stream 26 of data an address associated with the client device 22. FIG. 1 illustrates the router 28 executing a monitoring application 30. The monitoring application 30 is a software algorithm that monitors the performance of the server 20 and/or the communications network 24. The monitoring application 30 extracts many different data records 32 and stores the data records 32 in a streaming database 34. The monitoring application 30 may query the streaming database 34 for the data records 32, and the monitoring application 30 analyzes the data records 32. The monitoring application 30 may then generate reports and/or alarms indicative of the performance of the server 20 and/or the communications network 24. While FIG. 1 illustrates the router 28 executing the monitoring application 30, the router 28 is only an exemplary hardware component that monitors performance. The monitoring application 30 may be executed by any network component.

Figure 2:
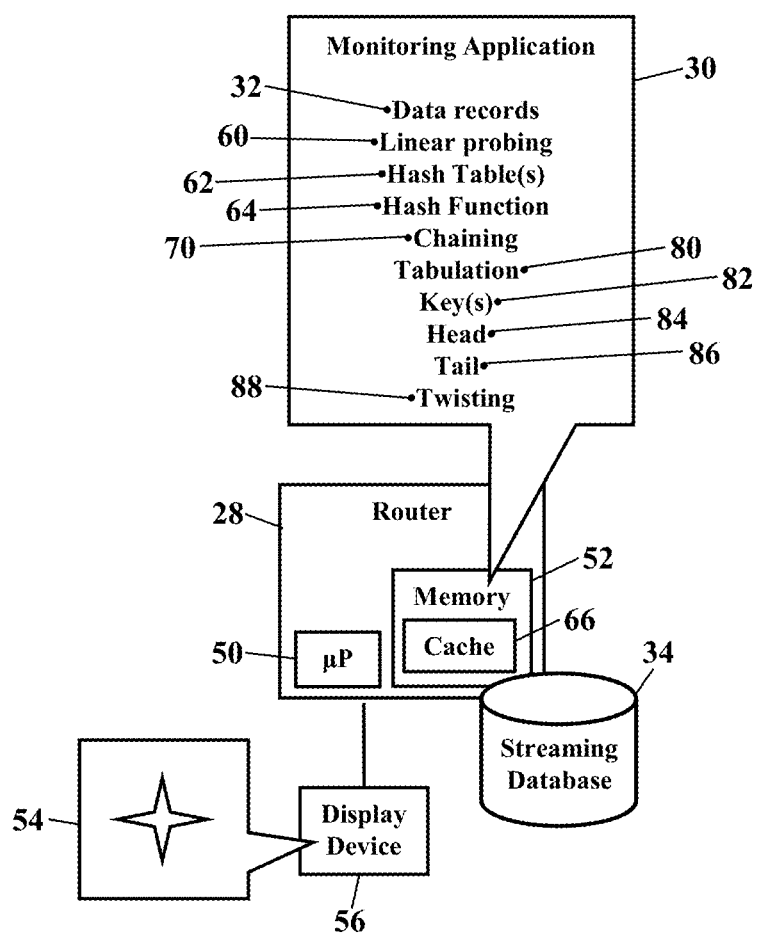
FIG. 2 is a more detailed schematic illustrating the operating environment, according to exemplary embodiments.

FIG. 2 is a more detailed schematic illustrating the operating environment, according to exemplary embodiments. The router 28 has a processor 50 (e.g., "μP"), application specific integrated circuit (ASIC), or other component that executes the monitoring application 30 stored in a memory 52. The monitoring application 30 may cause the processor 50 to produce a graphical user interface ("GUI") 54. The graphical user interface 54 is illustrated as being visually produced on a display device 56, yet the graphical user interface 54 may also have audible features. The monitoring application 30, however, may operate in any processor-controlled device, as later paragraphs will explain.

The monitoring application 30 classifies the data records 32. The monitoring application 30, for example, may use linear probing 60 to classify the data records 32. The monitoring application 30 thus accesses one or more hash tables 62, which are known features of the linear probing 60. The hash tables 62 may be generated by a hash function 64, which is stored in the memory 52 and executed by the processor 50. The hash function 64 may be a separate module or portion of the monitoring application 30. The hash table 64, for example, may be stored in a buffer or cache portion 66 of the local memory 52, but the hash table 62 may be remotely accessed and maintained at any location in the communications network (illustrated as reference numeral 24 in FIG. 1). An example of the monitoring application 30 is the GIGAS-CAPE® application for monitoring network traffic.

Regardless, the one or more hash tables 62 are often bottlenecks in processing data streams, such as the stream 26 of data and other Internet traffic. Applications using the hash tables 62 are often time critical, in the sense that if the hash tables 62 cannot keep up with the traffic, then data will be lost. Keeping up with traffic requires both good average throughput over the length of the stream 26 of data (e.g., good amortized performance) and fast handling of individual data items (e.g., worst-case performance). Interest in worst-case performance is motivated not only by the real-time requirements of such systems, but also by the worry of adversarial attacks: if an adversary can accurately time the performance of the system of various data items, it could conceivably mount a denial-of-service attack by exploiting key values that the hash tables 62 are unusually slow in handling.

Conventional hashing techniques may thus utilize back-up hash tables. To handle the occasional slow queries in a main hash table, conventional hashing techniques may establish a back-up hash table. Whenever the number of probes made by an insertion passes a certain constant threshold, the data item is deferred to a secondary hash table. The goal or hope is to keep the secondary back-up hash table sparse enough such that no operation will require high running time. Unfortunately, the use of a second layer of hashing to improve robustness complicates the implementation and slows down the queries (which must always look up keys in two hash tables).

Exemplary embodiments reduce, or even eliminate, secondary hashing. The perceived non-robustness of linear probing is not inherent, but rather an artifact of using weak hash functions. Exemplary embodiments thus show that a strong hash function 64, backed up by an appropriate mathematical analysis, improves the state of the art among practical implementations of robust hash tables.

Exemplary embodiments may utilize short-range amortization. Robustness may utilize the following overlooked property of simple hash tables:

Observation 1: In chaining and linear probing with constant load, any window of $L=\theta(\lg n)$ operations on distinct keys takes time $\theta(L)$ w.h.p.

The proof of this observation is rather elementary and will be implicit in the technical analysis below. Conceptually, Observation 1 shows that chaining (illustrated as reference numeral 70 in FIG. 2) and the linear probing 60 can be used, with nearly-ideal robustness guarantees, in any streaming application that can afford a buffer of size $\Omega(\lg n)$. Real-time systems (such as the network router 28) are normally implemented with cyclic buffers, so the short-window amortization, of Observation 1 is an implicit property of the system that comes at no cost.

The conceptual message of Observation 1 is the following: instead of designing a (complicated) hash table 62 that guarantees O(1) worst-case performance, exemplary embodiments may use simple and practical hash tables by augmenting the system design with a very short buffer. Note that this conceptual observation does not close the problem of practical robust hash tables, but merely rephrases the question from the design of hash tables to the design of hash functions. The simplicity and efficiency of the linear probing 60 or chaining 70 can only be enjoyed with a similarly efficient and elegant hash function 64 that makes Observation 1 "come true." Further discussion of this hash function design problem is reserved for later paragraphs.

A potential concern about the robustness guarantee of Observation 1 is that it may require that the operations in the window be on distinct keys. This is clearly needed for any concentration-type property: for instance, L copies of the same unsuccessful query will run exactly L times slower than a single query. If we are willing to augment the hash table 62 to support repeated keys in a short window, many simple solutions suggest themselves. The simplest is to store the last $L=\theta(\lg n)$ keys in a secondary table of size $n^\epsilon$, which guarantees constant-time operations w.h.p.

To maintain a practical, pragmatic stance, however, these solutions would burden the implementation with no real benefits. Indeed, an important feature of modern hardware is caching, and the running time of an algorithm is normally dominated by memory accesses outside the cache portion 66 of the local memory 52. In both linear probing 60 and chaining 70, two operations to the same key will access the exact same memory locations, except for possible a few locations affected by insertions and deletions intervening between the two operations. This means that if the processor 50 offers a cache 66 of nontrivial size, i.e. larger than $L=\theta(\lg n)$ by an appropriate constant factor (a very realistic assumption), then any repeated key in a short window will actually incur a negligible running time, since all necessary data is already available in cache. The inventors believe this completely resolves the issue of repeated keys in a small window, and thus this matter is ignored.

The performance of an individual operations in the linear probing 60 has been the subject of intense theoretical investigations in published literature. Unfortunately, from a robustness perspective, the conclusion is negative: we expect frequent bad performance. Here the inventors switch to the study of a window of log n operations, showing that the combined performance is robust. Studying log n operations offers obvious challenges for implementable hashing schemes, e.g., in the classic notion of O(1)-independence, the inventors have the issue that the keys in the window are not hashed independently, yet the inventors have, to show that bad performance with one key does not correlate too strongly with bad performance for the other keys.

The analysis so far highlights an interesting general target ("short-range amortization") in the analysis of streaming algorithms in the context of real-time performance guarantees: if one can show that the running time of the algorithm has a very robust behavior over a short window of stream items, then by simply augmenting the system design with a large enough buffer, one can avoid the design of more complicated algorithms that might guarantee a worst-case time bound per stream item. As a prime example of this analysis target, the inventors concentrate on one of the most fundamental data structure problems: the dictionary problem. The goal is to use classic, realistic hash tables 62 such as chaining and linear probing to achieve robustness guarantees comparable to more complicated data structures that were specially designed for robustness.

Note that short-range amortization may not settle the question of robustness for chaining and linear probing, but merely rephrases it into an interesting question about hash function design. Indeed, the promise of simplicity and practical efficiency of using linear probing/chaining with robustness guarantees is only realized if an equally simple and practical hash function 64 can be used to implement these schemes and maintain the robustness guarantee.

The inventors may thus start with the following intriguing question about replacing the assumption of truly random hashing by an explicit hash function:

Question 1: Can one design a simple and practically efficient hash function preserving the guarantees of Observation 1?

The standard theoretical paradigm used to analyze explicit hash functions is the notion of k-independence. In our case, it is standard to show that Observation 1 continues to hold with $O(L)$-independent hash functions, i.e. with $\theta(\lg n)$-independence. Unfortunately, known hash functions that guarantee $\theta(\lg n)$-independence fail to address our basic question, as they are neither simple nor realistic in a practical implementation. Note that all solutions besides polynomial hashing use tabulation (illustrated as reference numeral 80), i.e. they use memory that is at least a root of the universe size. The use of tabulation techniques for strong hash functions is almost universal in the literature, and is, to some extent, justified by a lower bound. This lower bound states that any $\omega(1)$-independent family of hash functions with $O(1)$ evaluation time requires space $u^{\Omega(1)}$.

Fortunately, tabulation-based techniques are not incompatible with the goal of designing practically efficient hash functions. By choosing an appropriate parameter c, tables of size $u^{1/c}$ can be made to fit in fast cache, making evaluation very efficient. Among the surprising success stories in the literature, mention is made of the 5-independent tabulation family, which offer an order-of-magnitude speed-up compared to the fastest known implementation of 5-independent polynomial hashing.

An important canonical example of tabulation-based hashing is simple tabulation. In this hash function 64, a key $x \in [u]$ is interpreted as a vector of c characters from $\Sigma = [u^{1/c}]$, i.e. $x = (x_1, \ldots, x_c) \in \Sigma^c = [u]$. The hash function 64 is initialized by c tables $T_1, \ldots, T_c$ of $|\Sigma|$ random values (in the desired output range), and the hash function 64 is evaluated by looking up each character in its own table and xoring the results:

$$h(x) = \oplus_{i=1}^{c} T_i[x_i].$$

Simple tabulation is only 3-independent. However, the inventors have demonstrated that by stepping outside the k-independence paradigm and analyzing simple tabulation directly in applications, it is possible to prove much stronger properties than this independence would suggest. For example, if simple tabulation is used with linear probing in a table of fill $1-\epsilon$, the expected running time of an operation is $O(1/\epsilon^2)$, the same guarantee achieved by truly random hashing.

This ideal performance for an individual query may raise the hope that simple tabulation also answers the above design challenge, by guaranteeing good performance on a window of queries. Unfortunately, it does not, as the following simple counterexample shows:

Observation 2. Consider a linear probing table with fill ½ implemented with simple tabulation hashing. There exists an adversarial set of keys that can be inserted into the table, and a set of $L = \lg n$ queries such that the running time of the queries exceeds $$\Omega\left(L \cdot \frac{\lg n}{\lg \lg n}\right)$$

with probability at least $1/n^\epsilon$.

Proof: The construction is simply L "parallel" key sets. First insert into the hash table 62 the key set $[L] \times [n/L]$. At the end, execute the queries $[L] \times \{0\}$. By a simple counting argument, there is a probability of $1/n^\epsilon$ that $$\Omega\left(\frac{\lg n}{\lg \lg n}\right)$$

consecutive table positions following $h((i, 0))$ will be filled by keys from $\{i\} \times [n/L]$. If this happens for a certain $i \in [L]$, it will happen for all values of i, since the relative positions of the keys in $\{i\} \times [n/L]$ is the same up to a common shift by $T_1[i]$. This means that the queries are maximally correlated, and they can all become slower by an almost logarithmic factor simultaneously, with a nontrivial probability. The situation can be extended over a long stream of queries, e.g. querying $(i, j)$ for all $j \in [n/L]$ and all $i \in [L]$. We expect one in every $n^\epsilon$ windows of queries to deviate significantly from the expectation, by a nearly logarithmic factor. This is no better than robustness of an individual query, which also deviates from the mean by a logarithmic factor with $n^{-\epsilon}$ probability.

Exemplary embodiments twist the tabulation 80. The below paragraphs show that extending the guarantees of simple tabulation for a single query to robust guarantees on a window of queries only requires a very simple twist to the hash function 64, which preserves the simplicity and practical efficiency of simple tabulation.

In a key x (illustrated as reference numeral 82 in FIG. 2), the first character $x_1$ will play a special role, and will be called the head, $\text{head}(x) = x_1$ (illustrated as reference numeral 84). The rest of the key 82 is called the tail, $\text{tail}(x)$ (illustrated as reference numeral 86). Conceptually, the hash function 64 is initialized by $2c-1$ random tables:

c−1 twist tables $T^*_2, T^*_3, \ldots, T^*_c$, each of size $\Sigma$ containing random values from $\Sigma$.

c tables as in simple tabulation, $T_1, \ldots, T_c$, each of size $\Sigma$ containing random value from the desired output range [m].

The hash function 64 begins by twisting (illustrated as reference numeral 88 in FIG. 2) the head 84 of the key 82 according to the twisted hash code of the tail 86, and then evaluating simple tabulation on the twisted key:

$$x^* = \left(x_1 \oplus \left(\bigoplus_{i=2}^{c} T_i^*[x_i]\right), x_2, \ldots, x_c\right)$$

$$h(x) = \bigoplus_{i=1}^{c} T_i[x_i^*]$$

Though we have described the hash function in terms of $2c-1$ tables and $2c-1$ memory lookups, it can be seen that only c tables and lookups are needed. Indeed, we can combine $T^*_i$ and $T_i$ into a common table $T'_i$ with entries of $\lg \Sigma + \lg m$ bits. The hash function begins by xoring the entries corresponding to the tail, $\oplus_{i=2}^{c} T'_i[x_i]$. The low-order $\lg \Sigma$ bits of the result are xored with $\text{head}(x)$, after which we make the final lookup into $T_1$ for the hash code of the twisted head.

Thus, the implementation of twisted tabulation is essentially parallel to simple tabulation, requiring just one addition xor and one shift. It is known that, with a sensible choice of c, the practical efficiency of this scheme leaves nothing to be desired. On current architectures, the evaluation time turns out to be competitive to just one 64-bit multiplication, which can be considered the ultimate target for any hash function (since even the simplest universal hashing requires multiplication).

Despite the simplicity of this new hash function 64, an appropriate analysis reveals that it offers strong robustness guarantees over a set of queries in both the linear probing 60 and chaining 70. We will prove the following theorems:

Theorem 2. In chaining implemented with twisted tabulation, any window of $$L = \Theta\left((\log n) / \left\lceil \frac{n}{m} \right\rceil\right)$$

operations on distinct keys has total cost $$O\left(L \left\lceil \frac{n}{m} \right\rceil\right)$$

with high probability in n.

Theorem 3. Consider linear probing implemented with twisted tabulation, and let the fill be $$\frac{n}{m} = 1 - \varepsilon$$

where $\varepsilon \geq 1/n^{o(1)}$. Any window of $L \geq \lg n$ operations on distinct keys will have total cost $O(L/\varepsilon^2)$ with high probability in n. The reader may observe that short-range amortization with twisted tabulation loses nothing compared to the performance of a single query, and we recover the optimal dependence on the fill achieved by truly random hashing. Thus, twisted tabulation offers a simple and efficient solution that losslessly transforms single-operation performance under truly random hashing into robust amortized performance over short windows.

An analysis is now presented. The following known theorem captures some of the fundamental properties of simple tabulation that we shall reuse in many places.

Theorem 4 (Simple Tabulation). Consider hashing n balls into $m \geq n^{1-1/(2c)}$ bins by simple tabulation. Let q be an additional query ball, and define $X_q$ as the number of regular balls that hash into a bin chosen as a function of h(q).

$$\text{Let } \mu = E[X_q] = \frac{n}{m}.$$

The following probability bounds hold for any constant $\gamma$:

$$(\forall) \delta \leq 1 : Pr[|X_q - \mu| > \delta \mu] < 2e^{-\Omega(\delta^2 \mu)} + m^{-\gamma} \quad (1)$$

$$(\forall) \delta = \Omega(1) : Pr[X_q > (1+\delta)\mu] < (1+\delta)^{-\Omega((1+\delta)\mu)} + m^{-\gamma} \quad (2)$$

For any $m \leq n^{1-1/(2c)}$, every bin gets $$n/m \pm O(\sqrt{n/m} \log^c n). \quad (3)$$

keys with probability $1 - n^{-\gamma}$.

A caveat of Theorem 4 is that it only concerns the performance relative to a single query key, stating that from its perspective, things are essentially as good as with a perfectly random hash function 64. As revealed by the counterexample above, we know this is inherent for simple tabulation. We can construct a set of log n parallel universes, each with a single key 82, and so that the possibly bad performance of that key 82 is repeated in all universes.

We begin by observing that twisted keys remain distinct: if $x \neq y$, then $x^* \neq y^*$. Indeed, if tail(x)≠tail(y), the keys 82 are distinct because the tails 86 are not twisted; otherwise the twist added to the head 84 is the same, so the heads 84 (which must originally have been distinct) remain distinct. The main property that we shall is that we are, w.h.p., in the following situation:

Property 5. We have a set S of twisted keys and a disjoint set Q of twisted query keys. Let n=|S|+|Q|. Let $\phi \in (0,1]$ be a constant parameter to be determined, and assume that $n \geq \Sigma^\phi$ and $|Q| \leq \Sigma^{\phi/3}$. Now for every character $a \in \Sigma$:

(i) There are $O(1+n/\Sigma^\phi)$ keys from S with head a.

(ii) There are at most O(1) query keys from Q with head a.

Proof: We show that twisted tabulation satisfies the property with $$\phi = 2/3 \text{ w.h.p. in } \Sigma.$$

First we argue that when we twist distinct keys x and y, we get distinct twisted keys x* and y*. It is only the heads 84 that get twisted, so if x and y differ in the tails 86, then so do x* and y*. Hence we may assume that they only differ in the heads 84 while they have a common tail z. In this case, the twisted heads 84 are $$\text{head}(x) \oplus hs_0(z) \text{ and } \text{head}(y) \oplus hs_0(z),$$

so with common tails 86 and differing heads 84, we get differing twisted heads.

Lemma 6. Let T be a set of at most $\Sigma^{2/3}$ keys. When se twist these keys, then, due in $\Sigma$, each twisted head is shared by O(1) keys front T.

Proof: A similar argument was used in the literature, but exemplary embodiments take the twisting 88 into account. Consider the set A of keys that end up with a given twisted key a. Above we just proved that with common twisted heads 84, the tails 86 must be different, so the keys in A have distinct tails 86. The twisting of the heads 84 in A is based on simple tabulation of these distinct tails. From the literature it is known that we can find a subset $$B \subseteq A \text{ of size max}\{|A|^{1/(c-1)}, \lg|A|\},$$

so that simple tabulation maps the tails from B independently. For each $x \in B$, we have $$\text{head}(x') = hs_0(\text{tail}(x)) \oplus \text{head}(x) = a.$$

Hence, for the given set B, the combined probability of the common twisted head a is $$1/\Sigma^{|B|}.$$

With the set size b=|B| fixed, the probability of any such set is $$\binom{\Sigma^{2/3}}{b} \Sigma / \Sigma^b \leq b^b / \Sigma^{b/3+1}.$$

With a large enough $b = \Theta(1)$, we conclude, w.h.p. in $\Sigma$, that this does not happen for any subset $B \subset T$ of size b, but then this also limits the size of A.

Applying Lemma 6 to the small query set Q, we immediately get property (ii). To prove (i) we partition $S \cup Q$ arbitrarily into $O(1+n/\Sigma^{2/3})$ sets $S_i$ of size $\theta(\Sigma^{2/3})$. Each Set $S_i$ contributes a constant to each twisted head, so in total, each twisted head is common to $O(1+n/\Sigma^{2/3})$ keys from S. This completes the proof that twisted keys, w.h.p. in $\Sigma$, satisfy Property 5 with $\phi=2/3$.

The chaining 70 is now discussed. As a warm-up illustrating some of the basic ideas, we handle chaining assuming that Property 5 holds for our twisted keys.

Theorem 7: Assuming Property 5, if we amortize over windows with more than (log n)/(1+n/m) operations on distinct keys, then w.h.p. in n, the cost per operation is O(1+n/m).

The bound of Theorem 7 does not benefit from n≤m, so adding dummy keys, we can assume n≥m. In the proof of Theorem 7, we first describe all the relevant consequences of Theorem 4. The interesting new part, that does not hold for simple tabulation, is captured by Lemma 8 below, which will also be used in our study of linear probing.

First, by Theorem 4, if n=Ω(m log n), then w.h.p. in n, all bins/chains have O(n/m) keys, and then every operations take O(n/m) time. We can therefore assume that n/m=o(log n). We are studying the variable $X_Q$ denoting the number of keys from S ending up in the same bins as the query keys. The counting is with multiplicity if we have multiple queries in the same bin. We want to show that $X_Q=O(|Q|)$ with w.h.p.

Exemplary embodiments may divide the keys into groups depending on the head character. A query group is one that contains a query key. We let R denote the family of query groups and $\mathcal{G}$ denote the set of all non-query groups. Their contributions to $X_Q$ are denoted $X_{\mathcal{R},Q}$ and $X_{\mathcal{G},Q}$, respectively.

Exemplary embodiments may first fix the hashing of all the tails. Applying Theorem 4 to each group G, w.h.p., we get that each bin gets only a constant number of keys from G in each bin. By the union bound, this holds for all groups. Note that the total number of keys in all the query groups from R is bounded by $$\Sigma^{\phi/2} n/\Sigma^{\phi} = n/\Sigma^{\Omega(1)} \text{ keys,}$$

so applying Theorem 4, we conclude, w.h.p., that the query groups distribute with only a constant number of keys in each bin. The contribution $X_{\mathcal{R},Q}$ of R to $X_Q$ is then a constant per query, as desired. We also note that we have only a constant number of queries per query group, so our multiplicities are constant. The more interesting thing is how the non-query groups distribute in the query bins.

Lemma 8. Suppose we have m≥n/$\Sigma^{\phi/3}$ bins. After we have fixed the hashing of all tails and all query heads, w.h.p., no matter how we fix the head of any non-query group G∈$\mathcal{G}$, the groups contribution $X_{G,Q}$ to the query bins is O(1). If multiple queries am in the same bin, the keys from G in this bin are counted with multiplicity.

Proof: There are less than n groups, so by the union bound, it suffices to prove the high probability for an arbitrary group G. Likewise, for each group there are only m hash values, so it suffices to prove high probability for any given one, i.e., the situation where the hash of G is completely fixed with O(1) keys in each bin. Thus, we will show that the contribution $X_{\mathcal{G},Q}$ from G is constant w.h.p.

Independent random hashing of the query heads is performed. A query group A has O(1) queries, each ending in a bin with O(1) keys from G. Hence the contribution from A to $X_{\mathcal{G},Q}$ is O(1). Thus $X_{\mathcal{G},Q}$ is the sum of independent contributions bounded by some constant d. Moreover $$E[X_{G,Q}] = |G||Q|/m \leq n/\sigma^{\phi} \cdot \Sigma^{\phi/3}/(n/\Sigma^{\phi/3}) \leq 1/\Sigma^{\phi/3}.$$

It follows w.h.p. in Σ that $X_{\mathcal{G},Q}=O(d)$.

By Lemma 8, after we have hashed the query groups and all tails, each $X_{G,Q}$ is an independent O(1) contribution to $X_{\mathcal{G},Q}$. Moreover $E[X_{\mathcal{G},Q}]=\sum_{G\in\mathcal{G}} |G||Q|/m \leq n|Q|/m = O(\log n)$. It follows by Chernoff bounds, w.h.p., that $X_{\mathcal{G},Q}=O(\log n)=O(|Q|n/m)$. This completes the proof of Theorem 7.

In preparation for linear probing, a summary so far is presented with a slight strengthening. When exemplary embodiments hash into m bins, the bins are indexed 0, 1, ... m−1. We consider bin i and i+1 neighbors, wrapping around with neighbors 0 and m−1. With these bins, the triple bin of a query is the query bin and the two neighboring bins. It can easily be checked that considering the triple bins of the queries rather than just the query bins can only change the constants.

Proposition 9. Suppose we have m≥n/$\Sigma^{\phi/3}$ bins. After we have fixed the hashing of all tails and all query heads, w.h.p., the query groups contribute O(1) to the triple bin of each query. Moreover, no matter how toe hash the head of any non-query group G∈$\mathcal{G}$, the groups combined contribution $X_{G,Q}$ to the triple bin of all the queries is O(1).

The linear probing 60 is now discussed. We show here that the linear probing 60 is very robust if we use it with twisted tabulation hashing, or any other scheme using simple tabulation on twisted keys satisfying Property 5 with high probability.

Theorem 10, Assume Property 5 holds for keys in a linear probing table with fill of a=n/m=(1−ε) where ε≥1/$n^{o(1)}$. If we amortize over windows with more than log n operations on distinct keys, then w.h.p. in n, the cost per operation is O(1/$\epsilon^2$).

The bounds of Theorem 10 are new and tight even for perfectly random hash functions. The bounds of Theorem 10 do not benefit from ε≤½, so adding dummy keys, we can assume 2n≥m. Others have proved that the expected cost per operation in linear probing is θ(1/$\epsilon^2$). Our Theorem 10 states that the expected cost is achieved within a constant factor w.h.p. as soon as we amortize over (log n) operations.

In linear probing all elements are kept in a single array with entries [0;m). Adding keys one by one, we place a key q in the first empty position starting from h(q). The positions that get filled this way does not depend on the order in which keys are inserted. To bound the cost of operations with a key q, including deletes, we consider the situation where q is already inserted. The immediate cost is the length $R_q$ of the run from h(q) to the first empty position. For upper bounds it is more convenient, however, to study the length $X_q$ of the filled run $I_q$ around h(q) between the empty slots on either side. Trivially $X_q \geq R_q$. The nice combinatorial property of $I_q$ is that exactly $X_q = |I_q|$ keys hash directly into $I_q$.

The basic result from the literature on linear probing with ε≤½ was that for any given key q, w.h.p.

$$Pr[X_q \geq x] \leq 2 e^{-\Omega(\epsilon^2 x)}. \quad (4)$$

This implies $X_q=O((\log n)/\epsilon^2)$ w.h.p. Here we show that for a set Q of query keys, w.h.p., $$Pr\left[\sum_{q\in Q} X_q \geq x\right] \leq 2^{O(|Q|)} e^{-\Omega(\epsilon^2 x)}. \quad (5)$$

From (5) with |Q|≥log n and a large enough x=θ(|Q|/$\epsilon^2$), we get $\sum_{q\in Q} X_q = O(|Q|/\epsilon^2)$ w.h.p., which is the statement of Theorem 10.

We now relate to Proposition 9. We know from (4) that, w.h.p. the filled interval $I_q$ around each query h(q) is of size $X_q=O((\log n)/\epsilon^2)$. Since $\Sigma^{\phi}=((\log n)/\epsilon)^{w(1)}$, the remark below implies that all the constant contribution bounds from Proposition 9 apply to the $I_q$.

Remark 11. With m'=θ(n/$\Sigma^{\phi/3}$), the triple bin of q∈Q from Proposition 9 contains the interval [[h(q)−θ($\Sigma^{\phi/3}$),h(q)+θ($\Sigma^{\phi/3}$)]].

With the constant contribution bounds of Proposition 9, we get to use Chernoff bounds as we would for fully random hash functions. Indeed, the remaining proof of Theorem 10 is essentially the same as it would be in the fully-random case. However, even in the fully-random case, Theorem 10 was not known, and for $\epsilon=o(1)$, the proof becomes rather delicate. There are essentially two sources behind the factor $2^{O(|Q|)}$. One is to imply that we are willing to pay $O(1)$ per key. The more essential source has to do with the number of ways that the total contribution $$\underline{X_Q} = \Sigma_{q \in Q} X_q$$

to the query intervals can be distributed on the individual contributions $X_q$. We get an exponential bound if we only need to know the individual contributions within a constant factor. Formally, we use the following simple combinatorial lemma:

Lemma 12. There is a universal family $W_l$ of $2^{O(l)}$ weight vectors $\vec{w}=(w_1,\ldots,w_l)$ where $\Sigma w_i > \frac{1}{4}$ and for all i, either $w_i \geq 1/(2l)$ or $w_i=0$, and such that for every vector $\vec{z}=(z_1,\ldots,z_l)$ with $\Sigma z_i = 1$, there is a $(w_1,\ldots,w_l) \in W_l$ with $w_i \leq z_i < 2w_i$ for all i with $w_i > 0$.

Proof. First we show how a trivial map from a given $(z_1,\ldots,z_l)$ to $(w_1,\ldots,w_l)$. Later we bound the size of the range $W_l$. For each i, if $z_i < 1/(2l)$, we set $w_i=0$, otherwise, we round $z_i$ down to the nearest negative power of two to get $w_i$. The cases $z_i$ with $w_i=0$ can add up to at most $\frac{1}{2}$ and in the remaining cases, we lose less than a factor 2, so $\Sigma_i w_i > ((\Sigma_i z_i) - \frac{1}{2})/2 = \frac{1}{4}$.

Let p be the smallest integer such that $2^p > 2l$. Then for each i there is a, $j=\{0,\ldots,p-1\}$ such that $w_i=2^{j-p}$. To describe $(w_1,\ldots,w_l)$, we first have a base bit vector with l bits, telling when $w_i > 0$. In addition, for $j=0,\ldots,p$, we have a step-up bit vector that for each $w_i > 2^{j-p}$ tells if $w_i > 2^{j+1-p}$. All these bits describe a unique $\vec{w}$. Since $\Sigma_i w_i \leq 1$, the number of bits in step-up vector j is less than $\frac{1}{2^{j-p}} < 4l/2^j$, so the total number of bits is $1 + \Sigma_{j=0}^{p}(4l/2^j) < 9l$. Thus $|W_l| < 2^{9l}$.

We will use $W_Q$ to denote $W_{|Q|}$ but using the queries $q \in Q$ and indices. Now, suppose we want to bound the probability that $X_Q = \Sigma_q X_q = \theta(x)$ for some value $x = \Omega((\log n)/\epsilon^2$. This probability will decrease exponentially in x, so we will automatically get a bound for $X_Q = \Omega(x)$. It is, however, crucial that we also have an upper bound on $X_Q$ before we focus on the individual contributions $X_q$. Using Lemma 12, we know that $W_Q$ contains a vector $(w_q)_{q \in Q}$ such that $w_q > 0$ implies $X_q = \theta(w_q x)$. Using the union bound, we consider one $(w_1,\ldots,w_l)$ at the time. We know $W_{|Q|} = 2^{O(|Q|)}$, so to prove (5), it suffices to prove, w.h.p., $$Pr[\forall w_q > 0 : X_Q = \theta(w_q x)] = 2^{O(|Q|)} e^{-\Omega(\epsilon^2 x)}. \quad (6)$$

From (4) we got $X_q = O((\log n)/\epsilon^2)$ w.h.p., so we can assume that $x_q = w_q x = O((\log n)/\epsilon^2)$ for all $q \in Q$. We are looking for an interval $I_q$ of length $X_q = \theta(x_q)$ with at least $|I_q|$ keys hashing to it. If $I_q$ was fixed, the expected number of keys hashing to $I_q$ is only $(1-\epsilon)|I_q|$.

As stated in Remark 11, we inherit all the constant contributions bounds from Proposition 9. In particular, it follows, w.h.p., that the query groups combined only contribute a constant number of keys to $I_q \subset [h(q) - \theta(\Sigma^{\Phi/3}), h(q) + \theta(\Sigma^{\Phi/3})]$.

Let $a = O(1)$ bound the maximal contribution from the query groups to any query interval. Then $X_q \leq X_{G,I_q} + a$ where $X_{G,I_q}$ is the contribution of the non-query groups $G \in \mathcal{G}$ to the query interval $I_q$. We now restrict our attention to intervals $I_q$ of length at least $2a/\epsilon$. Then to fill $I_q$ with $X_q \geq |I_q|$, we need $X_{G,I_q}$ to be bigger than $(1+\epsilon/2)a|I_q| = (1+\epsilon/2)(1-\epsilon)|I_q| < |I_q| - < a$.

The lower bound $2a/\epsilon$ on $|I_q|$ does not affect our proof of (6), for it suffices to consider $x \geq 2b|Q|/\epsilon^2$ for a large enough constant b. By definition of $W_Q$, we have $w_q \geq 1/(2|Q|)$ if $w_q > 0$, so we get $x_q = x w_q \geq b/\epsilon^2$. For large enough b, this implies $a/\epsilon < |I_q| = \theta(x_q)$. With $\vec{w}$ fixed, we only care about queries q, with $w_q > 0$. In our formulas below, we will simply assume that Q has been restricted to such queries. Technically, this could leave some query groups with zero queries, but that does not matter. Thus we can assume $$\forall q \in Q : x_q > b/\epsilon^2 \text{ for any fixed constant } b. \quad (7)$$

Having discounted the effect of the query groups, from now on, we restrict our attention to the fill from the non-query groups in $\mathcal{G}$. For $\delta = \epsilon/2$, we are looking for an interval $I_q$ of size $\theta(x_q)$ so that the contribution $X_{\mathcal{G},I_q}$ from the non-query groups in $\mathcal{G}$ to $I_q$ is at least $(1+\delta)a|I_q|$. If $I_q$ was fixed, the expected value of $X_{\mathcal{G},I_q}$ would be bounded by $a|I_q|$. Our problem is, of course, that $I_q$ could be anywhere as long as it has length $\theta(x_q)$ and contains $h(q)$.

$\epsilon = \Omega(1)$. Before considering the case of small $\epsilon$, we consider the easier case where the fill is bounded from 1, that is $\epsilon = \Omega(1)$. Then from [PT11], we know combinatorially that having $(1+\delta)a|I_q|$ keys in $I_q \ni h(q)$ implies that one of $O(1/\epsilon)$ dyadic interval $J_q$ of length $\theta(\epsilon|I|) = \theta(\epsilon x_q)$ around $h(q)$ has $(1+\delta/2)|J_q|$ keys. Here a dyadic interval is one of the form $[i2^p, (i+1)2^p)$ for some integer power p. We index the potential dyadic intervals $-k,\ldots,0,\ldots,k$, $k = (1/\epsilon)$ with 0 representing the one containing $h(q)$, and $-1$ and $+1$ for its neighbors and so forth. It is important that the indexing is the same no matter the size of I. Over all queries q, there are only $(2k+1)^{|Q|}$ choices of indices. Assume that we have guessed the right bad index for every query q, pointing out a specific dyadic interval $J_q$ relative to $h(q)$. Our indexed bad event is that the non-query groups contribute $(1+\delta/2)a|J_q|$ keys to $J_q$ for every q.

We shall use the following notation. For each non-group G and query q, we let $Y_{G,q}$ denote the contribution of G to $J_q$. Summing over the non-query groups, we define $Y_q = \Sigma_{G \in \mathcal{G}} Y_{G,q}$. With $\mu_q = a|J_q|$, we get $E[Y_q] \leq a|J_q|$ and in the bad event, $Y_q \geq (1+\delta/2)a|J_q|$.

From Proposition 9 and Remark 11, we get that after the hashing of the tails and the query heads (including the $h(q)$), the contribution $Y_{G,Q} = \Sigma_{q \in Q} Y_{G,q}$ of a non-query group G to all the query intervals $J_q \subseteq [h(q) - \theta(\Sigma^{\Phi/3}), h(q) + \theta(\Sigma^{\Phi/3})]$ is $O(1)$. The $Y_{G,Q}$, $G \in \mathcal{G}$, are independent random variables to be fixed when we hash the non-query group heads.

Let $Y = \Sigma_{G \in \mathcal{G}, q \in Q} Y_{G,q} = \Sigma_{G \in \mathcal{G}} Y_{G,Q} = \Sigma_{q \in Q} Y_q$ be the combined contribution of all non-query groups to all the query intervals $J_q$. Then Y is the sum of independent $O(1)$ variables $Y_{G,Q}$, so Chernoff bounds may be applied. With $\mu = \Sigma_{q \in Q} \mu_q$, we get $E[Y] \leq \mu$ while the bad event implies $$Y \geq (1+\delta/2)/\mu = (1+\epsilon/2)\mu.$$

Finally $$\mu = \sum_{q \in Q} \alpha |J_q| = \sum_{q \in Q} \Theta(\epsilon x_q) = \Theta(\epsilon x) = \Theta(x).$$

It now follows from Chernoff bound that the probability of the indexed bad event is $\exp(-\Omega(\epsilon^2 x))$.

The bad event from (6) implies that one of the $(2k+1)^{|Q|}$ index vectors are bad, so be the union bound, we get an overall probability bound of $$(2k+1)^{|Q|} \exp(-\Omega(\epsilon^2 x)) = 2^{O(|Q|)} \exp(-\Omega(\epsilon^2 x)).$$

The derivation exploits that $k = O(1/\epsilon) = O(1)$. This completes the proof of (6), hence of (5) and Theorem 10.

$\epsilon=o(1)$. We will now consider that much more intricate case where $\epsilon=o(1)$. Recall our bad event. With $\delta=\epsilon/2$, for each query q, we are looking for an interval $I_q$ of size $\theta(x_q)$ so that the contribution $X_{G,I_q}$ from the non-query groups in $\mathcal{G}$ to $I_q$ is at least $(1+\delta)a|I_q|$.

The single query version of this case was also studied in [PT11]. Instead of considering $\theta(1/\epsilon)=w(1)$ dyadic intervals, we look at dyadic intervals on different levels. From [PT11], we get the combinatorial statement that if an interval $I_q$ of length $\theta(x_q)$ has $(1+\delta)a|I_q|$ (non-query) keys, then for some "level" $i\geq 0$, there is one of $2^i$ the dyadic intervals $J_q$ of length $\theta(x_q/2^i)$ around h(q) which has $$\left(1+\delta 2^{\frac{4}{5}i}\right)\alpha|J_q|$$

(non-query) keys, the point here is that the relative deviation $$\delta_i = \delta 2^{\frac{4}{5}i}$$

grows with the number $2^i$ of intervals considered. As stated in [PT11], we only need to consider levels i where $\delta_i \leq 1$, so for $\epsilon=\Omega(1)$, there would only be a constant number of levels and dyadic intervals.

For each query q, we guess a level $i_q$, and an index $j_q=O(2^{i_q})$ of a dyadic interval $J_q$. We need to sum the probabilities over all such combination of levels and indices, of the indexed bad event that we for every q end up with $(1+\delta_{i_q})a|J_q|$ non-query keys in $J_q$. Below we first focus on one such indexed bad event and define the same random variables as we did with $\epsilon=\Omega(1)$. We have $Y_{G,q}$ denoting the contribution of non-query group CT to $J_q$, $Y_q=\Sigma_{G\in\mathcal{G}} Y_{G,q}$, $Y_{G,Q}=\Sigma_{q\in Q} Y_{G,q}$ and $Y=\Sigma_{q\in Q} Y_q = \Sigma_{G\in\mathcal{G}} Y_{G,Q}$. From Proposition 9 and Remark 11, we again get that every $Y_{G,Q}$ is bounded by some constant d. For each q, we also we define $\mu_q=a|J_q|$, so $E[Y_q]\leq \mu_q$ while the bad event implies $Y_q \geq (1+\delta_{i_q})\mu_q$.

We will derive some special Chernoff bounds tailored to handle all the queries despite the different $\delta_{i_q}$. The calculations are aimed to look like those in the standard proofs of Chernoff bounds. The interesting thing is all the arguments between the calculations explaining how the standard calculations can be applied.

To standardize the calculations, we first normalize, dividing all the above contributions by d. Using ' to denote this normalization. Then $Y'_{G,Q}\leq 1$ w.h.p. after the hashing of the tails and query heads are fixed. In this situation, the contributions from different non-query groups are independent variables to be fixed when we hash their group heads. More precisely, we have that the vectors $(Y'_{G,q})_{q\in Q}$ for different G are independent of each other. For contrast we note that for a given G, and different queries $q_1$ and $q_2$, the variables $Y'_{G,q_1}$ and $Y'_{G,q_2}$ may be highly correlated.

We are trying to bound the bad event that for all $q\in Q$ simultaneously, $Y'_q>(1+\delta_{i_q})\mu'_q$. We study the quantity $\Pi_{q\in Q}(1+\delta_{i_q})^{Y'_q}$. Our bad event implies that this quantity exceeds $\Pi_{q\in Q}(1+\delta_{i_q})^{(1+\delta_{i_q})\mu'_q}$, so by Markov's inequality, the probability of the bad event is bounded by $$\frac{E\left[\prod_{q\in Q}(1+\delta_{i_q})^{Y'_q}\right]}{\prod_{q\in Q}(1+\delta_{i_q})^{(1+\delta_{i_q})\mu'_q}}$$

Using the independence of the vectors $(Y'_{G,q})_{q\in Q}$ for different G, we get $$E\left[\prod_{q\in Q}(1+\delta_{i_q})^{Y'_q}\right] = E\left[\prod_{G\in\mathcal{G}}\prod_{q\in Q}(1+\delta_{i_q})^{Y'_{G,q}}\right] = \prod_{G\in\mathcal{G}} E\left[\prod_{q\in Q}(1+\delta_{i_q})^{Y'_{G,q}}\right].$$

For a given G, we now study $$\Phi_G = E\left[\prod_{q\in Q}(1+\delta_{i_q})^{Y'_{G,q}}\right].$$

We know that the $E[Y'_{G,q}]\leq \mu'_{G,q}$ and that $\Sigma_{q\in Q} Y'_{G,q}\leq 1$. Subject to these constraints, we claim that the distribution with the largest mean consists of values that are either one 1 and the 0s elsewhere, or all 0s. To prove this, we will transform any distribution into this form, without decreasing the mean $\Phi_G$. Thus consider some distribution with an event $\{y'_{G,q}\}_{q\in Q}=\{Y'_{G,q}\}_{q\in Q}$ happening with probability p>0. Suppose for that it is not of the above form. Let $s'_G=\Sigma_{q\in Q} y'_{G,q}$. First consider the case where $0<s'_G<1$. Since every $\delta_{i_q}>0$, we have $\Pi_{q\in Q}(1+\delta_{i_q})^{y'_{G,q}}>1$. By convexity this implies that we get a higher $\Phi_G$ if we locally, with probability $s'_G$ scale all $y'_{G,q}$ up by a factor $s'_G$, and use the all 0s event otherwise. Thus, we can assume $\Sigma_{q\in Q} y'_{G,q}=1$. Next, by the weighted arithmetic-geometric mean inequality, using the $y'_{G,q}$ as weights, we have $$\prod_{q\in Q}(1+\delta_{i_q})^{y'_{G,q}} \leq \sum_{q\in Q} y'_{G,q}(1+\delta_{i_q}).$$

However, the right hand side is exactly the contribution to $\Phi_G$ if we locally replace the event $\{y'_{G,q}\}_{q\in Q}=\{Y'_{G,q}\}_{q\in Q}$ with a distribution which has $Y'_{G,q}$ as the only 1 and 0s elsewhere with probability $y'_{G,q}$. Both transformations preserve the means of the $Y'_{G,q}$ and can only increase $\Phi_G$, and at the end, we get a distribution of the desired form. In the overall worst-case distribution, we have $Y'_{G,q}$ as the only 1 and 0s elsewhere with probability $E[Y'_{G,q}]\leq \mu'_{G,q}$. Therefore $$\Phi_G = E\left[\prod_{q\in Q}(1+\delta_{i_q})^{Y'_{G,q}}\right]$$

$$\leq \left(\sum_{q\in Q}\mu'_{G,q}(1+\delta_{i_q})\right) + \left(1 - \sum_{q\in Q}\mu'_{G,q}\right)$$

$$= 1 + \left(\sum_{q\in Q}\mu'_{G,q}\delta_{i_q}\right)$$

$$\leq \exp\left(\sum_{q\in Q}\mu'_{G,q}\delta_{i_q}\right)$$

Reordering terms, we now get the following probability bound for our bad event.

$$\frac{E\left[\prod_{q\in Q}(1+\delta_{i_q})^{Y'_q}\right]}{\prod_{q\in Q}(1+\delta_{i_q})^{(1+\delta_{i_q})\mu'_q}} = \frac{\prod_{G\in\mathcal{G}}E\left[\prod_{q\in Q}(1+\delta_{i_q})^{Y_{G,q}}\right]}{\prod_{q\in Q}(1+\delta_{i_q})^{(1+\delta_{i_q})\mu'_q}}$$

$$\leq \frac{\prod_{G\in\mathcal{G}}\exp\left(\sum_{q\in Q}\mu'_{G,q}\delta_{i_q}\right)}{\prod_{q\in Q}(1+\delta_{i_q})^{(1+\delta_{i_q})\mu'_q}}$$

$$= \frac{\prod_{q\in Q}\exp\left(\sum_{G\in\mathcal{G}}\mu'_{G,q}\delta_{i_q}\right)}{\prod_{q\in Q}(1+\delta_{i_q})^{(1+\delta_{i_q})\mu'_q}}$$

$$= \prod_{q\in Q}\frac{\exp(\mu'_q\delta_{i_q})}{(1+\delta_{i_q})^{(1+\delta_{i_q})\mu'_q}}$$

$$= \prod_{q\in Q}\left(\frac{\exp(\delta_{i_q})}{(1+\delta_{i_q})^{1+\delta_{i_q}}}\right)^{\mu_q/d}$$

$$= \prod_{q\in Q}\exp(-\Omega(\delta_{i_q}^2\mu_q)).$$

Incidentally, this is the same probability bound we would have gotten if the contributions to each $J_q$ where independent, which is certainly not the case. As a final step, recall that $\mu_q = a|J_q| = \Theta(x_q/2^{i_q})$. Moreover, $$\delta_{i_q}^2 x_q/2^{i_q} = \varepsilon^2 2^{\frac{8}{5}i_q}x_q/2^{i_q} = \varepsilon^2 2^{\frac{3}{5}i_q}x_q,$$

so we can rewrite our probability bound to $$\prod_{q\in Q}\exp(-\Omega(\varepsilon^2 2^{\frac{3}{5}i_q}x_q)).$$

We now have to sum the above probabilities over all combinations where we for each query q pick a level $i_q$, and an index $j_q$ picking of one out of the $2^{i_q}$ dyadic intervals. Hence we can compute the combined probability as $$Pr[\forall\, q\in Q: X_q = \Theta(x_q)]$$

$$= \sum_{(i_q)_{q\in Q}}\left(\prod_{q\in Q}\left(2^{i_q}\exp(-\Omega(\varepsilon^2 2^{\frac{3}{5}i_q}x_q))\right)\right)$$

$$= \prod_{q\in Q}\left(\sum_i\left(2^i\exp(-\Omega(\varepsilon^2 2^{\frac{3}{5}i_q}x_q))\right)\right).$$

Next, concerning the sum for given q, recall from (7) that we may assume $x_q > b/\epsilon^2$ for any constant b. Then $\epsilon^2 x_q = b$ and with b large enough, the terms $$2^i\exp(-\Omega(\varepsilon^2 2^{\frac{3}{5}i_q}x_q))$$

decreases rapidly with i. Therefore $$\sum_i\left(2^i\exp(-\Omega(\varepsilon^2 2^{\frac{3}{5}i_q}x_q))\right) = O(\exp(-\Omega(\varepsilon^2 x_q))).$$

Thus our probability bound simplifies to $$Pr[\forall\, q\in Q: X_q = \Theta(x_q)]$$

$$= \prod_{q\in Q}O(\exp(-\Omega(\varepsilon^2 x_q)))$$

$$= 2^{O(|Q|)}\exp\left(-\Omega\left(\varepsilon^2\sum_{q\in Q}x_q\right)\right)$$

$$= 2^{O(|Q|)}\exp(-\Omega(\varepsilon^2 x)).$$

This completes the proof of (6), hence of (5) and Theorem 10.

Figure 3:
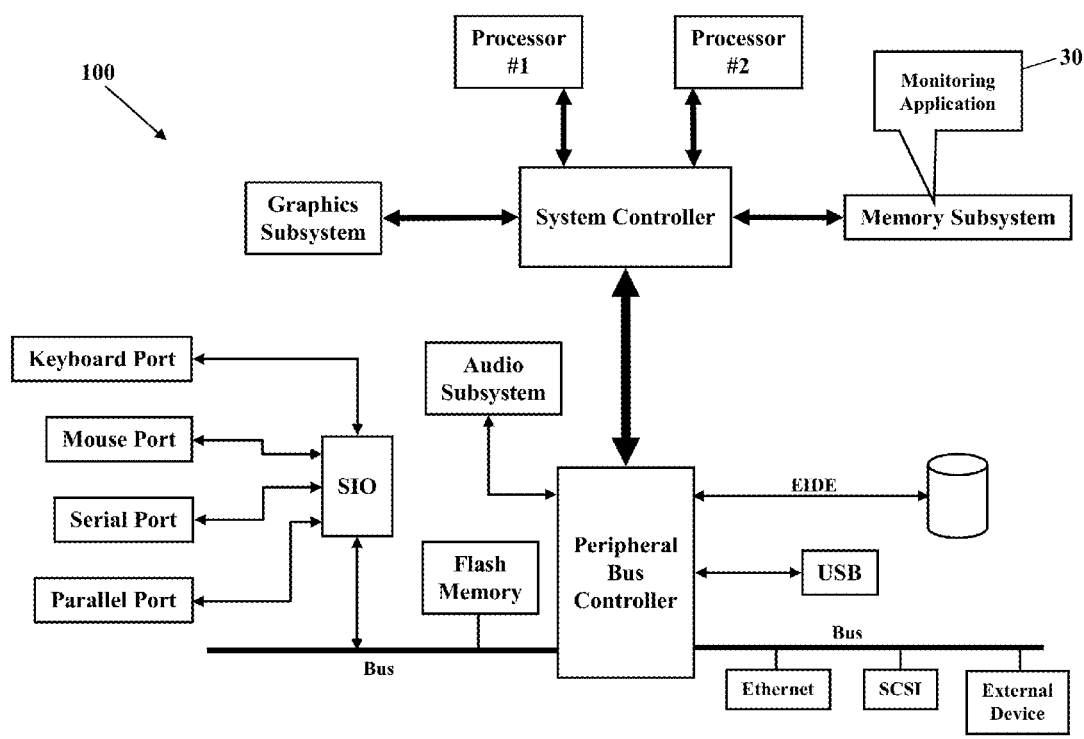
FIG. 3 is a generic block diagram of a processor-controlled device, according to exemplary embodiments.

FIG. 3 is a schematic illustrating still more exemplary embodiments. FIG. 3 is a generic block diagram illustrating the monitoring application 30 operating within a processor-controlled device 100. As the paragraphs explained, the monitoring application 30 may operate in any processor-controlled device 100. FIG. 3, then, illustrates the monitoring application 30 stored in a memory subsystem of the processor-controlled device 100. One or more processors communicate with the memory subsystem and execute the recommender application 26. Because the processor-controlled device 100 illustrated in FIG. 3 is well-known to those of ordinary skill in the art, no detailed explanation is needed.

Exemplary embodiments may be physically embodied on or in a computer-readable storage medium. This computer-readable medium may include CD-ROM, DVD, tape, cassette, floppy disk, memory card, and large-capacity disks. This computer-readable medium, or media, could be distributed to end-subscribers, licensees, and assignees. A computer program product comprises processor-executable instructions for monitoring data, as explained above.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A system, comprising:
   a processor; and
   memory storing code that when executed causes the processor to perform operations, the operations comprising:
   retrieving a hash function;
   generating a tabulation of the hash function;
   generating keys from the tabulation, with each of the keys having characters;
   denoting a first of the characters of each of the keys as a head;
   twisting the head of each of the keys to generate a twisted hash function; and
   hashing data using the twisted hash function.

2. The system according to claim 1, wherein the operations further comprise denoting remaining ones of the characters as a tail of the keys.

3. The system according to claim 2, wherein the operations further comprise xoring the tail of the keys.

4. The system according to claim 1, wherein the operations further comprise interpreting each of the keys as a vector.

5. The system according to claim 2, wherein the operations further comprise hashing the tail and fixing the head.

6. The system according to claim 2, wherein the operations further comprise generating a twisted key by twisting the head of one of the keys according to the tail of the one of the keys.

7. The system according to claim 6, wherein the operations further comprise tabulating the twisted key.

8. A method, comprising:
retrieving, from memory, a hash function;
retrieving, from the memory, keys that correspond to data to be classified using the hash function;
denoting, by a processor, a first character of each of the keys as a head;
denoting, by the processor, remaining characters of each of the keys as a tail;
twisting, by the processor, the head of one of the keys according to the tail of the one of the keys to generate a twisted hash function; and
hashing the keys using the twisted hash function.

9. The method according to claim 8, further comprising generating the keys from the data.

10. The method according to claim 8, further comprising xoring the tail of the one of the keys.

11. The method according to claim 8, further comprising interpreting each of the keys as a vector.

12. The method according to claim 8, further comprising hashing the tail and fixing the head.

13. The method according to claim 8, further comprising:
xoring tails of all the keys to generate a result; and
xoring heads of all the keys with the result.

14. The method according to claim 8, further comprising:
xoring tails of all the keys to generate a result; and
xoring the head of the one of the keys with the result.

15. A memory storing instructions that when executed cause a processor to perform a method, the method comprising:
retrieving a hash function;
retrieving keys that correspond to data to be classified using the hash function;
denoting a first character of each of the keys as a head;
denoting remaining characters of each of the keys as a tail;
twisting the head of one of the keys according to the tail of the one of the keys to generate a twisted hash function; and
hashing the keys using the twisted hash function.

16. The memory according to claim 15, further comprising instructions for generating the keys from the data.

17. The memory according to claim 15, further comprising instructions for xoring the tail of the one of the keys.

18. The memory according to claim 15, further comprising instructions for interpreting each of the keys as a vector.

19. The memory according to claim 18, further comprising instructions for:
xoring tails of all the keys to generate a result; and
xoring heads of all the keys with the result.

20. The memory according to claim 15, further comprising instructions for:
xoring tails of all the keys to generate a result; and
xoring the head of the one of the keys with the result.

* * * * *